United States Patent
Hill et al.

(10) Patent No.: US 11,966,292 B2
(45) Date of Patent: Apr. 23, 2024

(54) FAULT MANAGEMENT IN A DISTRIBUTED COMPUTER SYSTEM

(71) Applicant: HEWLETT PACKARD ENTERPRISE DEVELOPMENT LP, Houston, TX (US)

(72) Inventors: Nicholas Hill, Bloomingdale, MN (US); Peter J. Mendygral, Bloomingdale, MN (US); Kent D. Lee, Bloomington, MN (US); Benjamin James Keen, Enfield, CT (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 148 days.

(21) Appl. No.: 17/804,392

(22) Filed: May 27, 2022

(65) Prior Publication Data
US 2023/0385152 A1  Nov. 30, 2023

(51) Int. Cl.
G06F 11/00 (2006.01)
G06F 11/07 (2006.01)
G06F 11/14 (2006.01)
H04L 67/1029 (2022.01)

(52) U.S. Cl.
CPC ...... *G06F 11/1407* (2013.01); *G06F 11/0772* (2013.01); *H04L 67/1029* (2013.01)

(58) Field of Classification Search
CPC .............. G06F 11/0772; G06F 11/1407; G06F 11/1438; G06F 11/1471; G06F 11/203; G06F 9/546
See application file for complete search history.

(56) References Cited

U.S. PATENT DOCUMENTS 10,203,992 B2 * 2/2019 Ren ........................... G06F 9/46
2016/0154714 A1 6/2016 Lightner et al.

FOREIGN PATENT DOCUMENTS

WO 2006/055026 A1 5/2006

OTHER PUBLICATIONS

Sultana et al., "MPI Stages: Checkpointing MPI State for Bulk Synchronous Applications", Parallel Computing, vol. 84, 2019, pp. 1-14 (Year: 2019).*
Schafer et al., "Extending the MPI Stages Model of Fault Tolerance," 2020 Workshop on Exascale MPI (ExaMPI), 2020, pp. 52-61 (Year: 2020).*

(Continued)

*Primary Examiner* — Michael Maskulinski
(74) *Attorney, Agent, or Firm* — Trop, Pruner & Hu, P.C.

(57) ABSTRACT

In some examples, a distributed computer system includes a plurality of computer nodes, where the plurality of computer nodes include respective programs to cooperate to perform a workload. A first computer node includes a communication proxy between the program of the first computer node and a communication library that supports communications between the program of the first computer node and the programs of other computer nodes of the plurality of computer nodes, and a fault management service to monitor a health of the other computer nodes, and in response to a detection of a fault of a second computer node of the plurality of computer nodes, relaunch the communication proxy. The relaunched communication proxy selects, from a plurality of states, a common state to which the programs are to roll back.

20 Claims, 5 Drawing Sheets

(56) References Cited

OTHER PUBLICATIONS

Wikipedia, Message Passing Interface last edited on Feb. 22, 2022 (17 pages).
Wikipedia, Network socket last edited on Apr. 13, 2022 (7 pages).
Wikipedia, Remote direct memory access last edited on Jan. 30, 2021 (3 pages).
Wikipedia, SHMEM last edited on Jul. 3, 2021 (4 pages).
Nawrin Sultana, "Toward a Transparent, Checkpointable Fault-Tolerant Message Passing Interface for HPC Systems", Dec. 12, 2019, 2 pages.
Zhong et al., "Runtime level failure detection and propagation in HPC systems", Sep. 11-13, 2019, 11 pages.

* cited by examiner

FAULT MANAGEMENT IN A DISTRIBUTED COMPUTER SYSTEM

BACKGROUND

A distributed computer system can include multiple computer nodes that are able to communicate over a communication network. Programs can execute in the computer nodes in parallel to perform a given workload. A distributed computer system sometimes can be referred to as a high-performance computing (HPC) system.

BRIEF DESCRIPTION OF THE DRAWINGS

Some implementations of the present disclosure are described with respect to the following figures.

Figure 1:
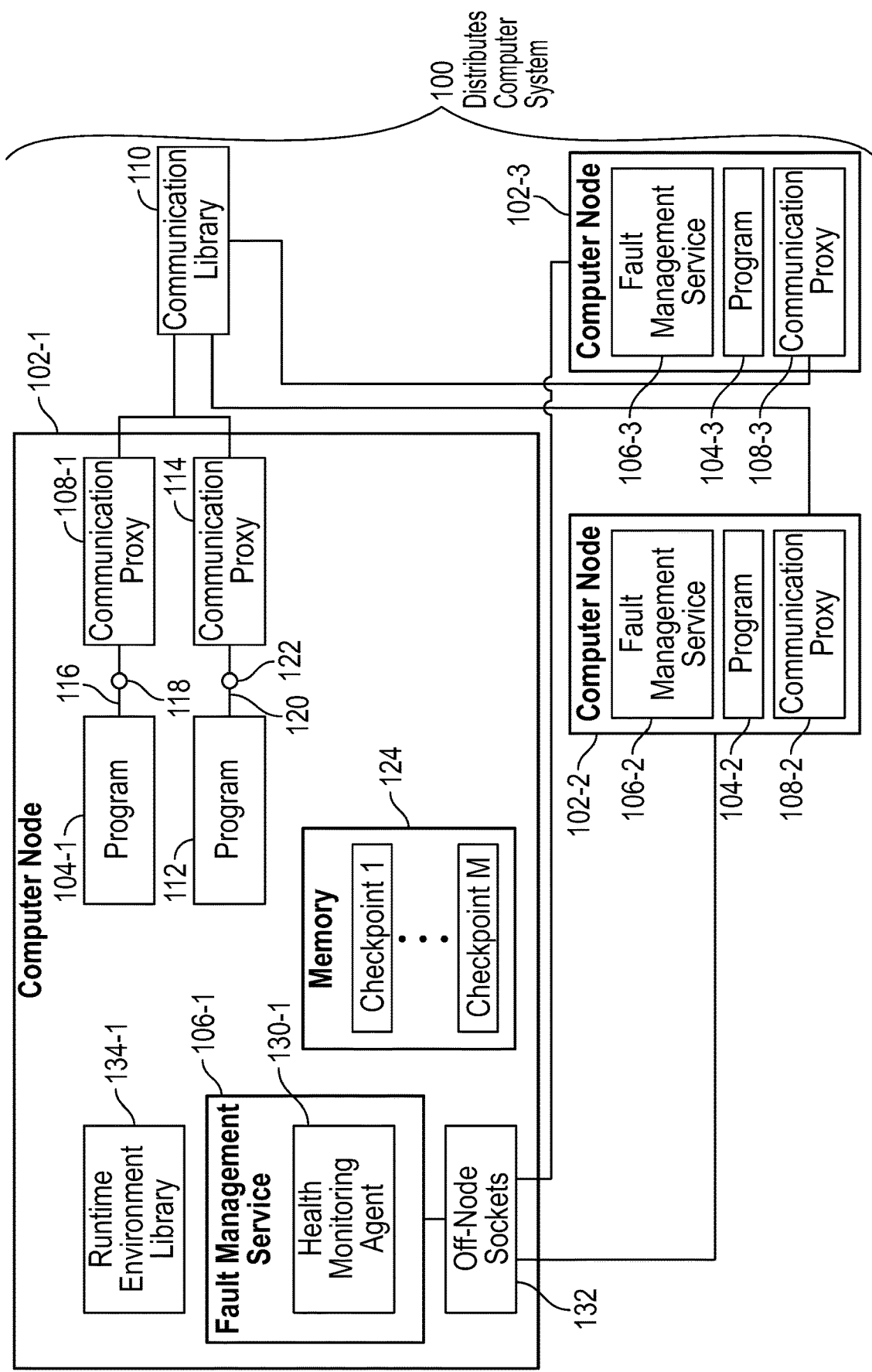
FIG. 1 is a block diagram of a distributed computer system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In some examples, a distributed computer system such as a high-performance computing (HPC) system can include a large quantity of computer nodes. For example, a distributed computer system can include hundreds of computer nodes, thousands of computer nodes, or millions of computer nodes.

Although reference is made to an HPC system, it is noted that more generally, a "distributed computer system" can refer to any computer system that has more than one computer node.

To achieve relatively high-speed communications of data during execution of programs in respective computer nodes of a distributed computer system, the distributed computer system can employ a high-performance communication library through which the programs can communicate with one another. An example of such a communication library is a Message Passing Interface (MPI) library. A communication library such as an MPI library includes routines that can be used by programs in the computer nodes to pass messages (containing data) to one another.

A "routine" refers to machine-readable instructions that can be invoked by another entity, such as a program executed in a computer node. A "library" can include multiple routines any of which that can be invoked for performing respective tasks. The routines of such communication library are used for purposes of communication data among the programs in the computer nodes. As examples, the routines communication library can be used to send data, to receive data, to cause a combination of partial results of computations, to synchronize operations among multiple computer nodes, and so forth.

Another example of a communication library is a SHMEM (Symmetric Hierarchical MEMory) library.

Both MPI and SHMEM can use remote direct memory access (RDMA) to perform data communications. RDMA refers to a technique of performing a direct memory access by an entity in a first computer node of a memory in a second computer node, without involving the operating system (OS) of either the first or second computer node.

Although reference is made to MPI and SHMEM as examples of communication libraries, in further examples, other types of communication libraries can be used by programs to communicate data with one another.

Computer nodes of a distributed computer system may exhibit faults, such as due to hardware failures in the computer nodes or failures or errors exhibited by machine-readable instructions executed in the computer nodes. In some cases, a communication library (e.g., an MPI communication library, a SHMEM communication library, etc.) may not support fault tolerance in a distributed architecture of computer nodes. As the number of computer nodes increase, the likelihood of encountering a computer node fault increases. A distributed computing computer system with a larger quantity of computer nodes is likely to exhibit faults more frequently than a distributed computer system with a smaller quantity of the computer nodes.

Without fault tolerance, a fault in any computer node may cause failure of a workload performed by programs executed in the computing nodes to fail. Fault tolerance (or resiliency) refers to a program's ability to handle a fault of an individual resource that the program runs on and continue to run to completion.

A "computer node" can refer to an arrangement of resources that enable performance of tasks. In some examples, the arrangement of resources can be contained within a physical housing of the computer node.

Examples of tasks can include any or some combination of the following: machine learning tasks (including tasks associated with training a machine learning system (e.g., a neural network, a classifier that performs classifications, etc.) and/or tasks associated with use of the machine learning system to produce outputs), graphics processing tasks, database processing tasks, data storage tasks, or other types of tasks. A "workload" can include a collection of tasks. In a distributed computer system, the tasks of a workload can be performed by multiple computer nodes.

Resources of a computer node can include hardware resources, such as any or some combination of a processing resource, a storage resource, and communication resource.

A processing resource can include a microprocessor, a core of a multi-core microprocessor, a microcontroller, a programmable integrated circuit, a programmable gate array, or another hardware processing circuit.

A storage resource can refer to any resource that can be used to store data, such as any or some combination of the following: a disk-based storage device, a solid-state storage device, a memory device, and so forth.

A communication resource can refer to a resource that is used to perform communications of data over a network. As examples, a communication resource can include a network interface controller, a wireless transceiver, and so forth.

A computer node can also execute programs. A "program" can refer to machine-readable instructions, such as software or firmware, that when executed can perform programmed tasks.

According to some implementations of the present disclosure, FIG. 1 shows a distributed computer system 100 that includes multiple computer nodes 102-1, 102-2, and 102-3 that execute respective programs 104-1, 104-2, and 104-3 that can cooperate to perform a workload. For example, if the programs 104-1, 104-2, and 104-3 are instances of a machine learning training software, then the workload includes tasks of training a machine learning system. In other examples, the programs 104-1, 104-2, and 104-3 can perform other tasks.

Although FIG. 1 shows an example with three computer nodes 102-1 to 102-3, in other examples, the distributed computer system 100 can include two computer nodes or more than three computer nodes (e.g., hundreds, thousands, or millions of computer nodes).

The computer node 102-1 runs a fault management service 106-1 that monitors a health of other computer nodes (e.g., 102-2 and 102-3). A "fault management service" can refer to machine-readable instructions that are executable on a processing resource of the computer node 102-1 to detect faults and initiate remediation actions to address the detected faults.

In some examples, the programs 104-1 to 104-3 running in the computer nodes 102-1 to 102-3 can include instances of a given software, such as instances of a machine learning training software used to train a machine learning system. An instance of a given software can refer to an invocation of the given software by another entity (e.g., a user, another program, or a machine). Multiple instances of the given software can be invoked for execution in one computer node or in multiple computer nodes.

The computer node 102-1 also includes a communication proxy 108-1 (between the program 104-1 of the computer node 102-1 and a communication library 110 (e.g., an MPI library, a SHMEM library, etc.) that supports communications between the program 104-1 and the programs 104-2 and 104-3 of the other computer nodes 102-2 and 102-3. In some examples, a communication proxy is uniquely paired with each program in a computer node.

In response to detecting a fault of another computer node (e.g., 102-2), the fault management service 106-1 relaunches the communication proxy 108-1. The relaunched communication proxy 108-1 can select, from multiple checkpointed states, a common state to which the programs 104-1 and 104-3 (in the healthy computer nodes 102-1 and 102-3 that have not experienced a fault) are to roll back.

In further examples, as shown in FIG. 1, multiple programs (e.g., the program 104-1 and another program 112) can run in a computer node (e.g., 102-1). For example, the program 104-1 can be an instance of a machine learning training software for performing a first task, and the program 112 can be another instance of the machine learning training software for performing a second task different from the first task. Another communication proxy 114 can be launched in the computer node 102-1 to support communications between the program 112 and the communication library 110.

In examples where the program 112 and the communication proxy 114 are also present, in response to detecting a fault of another computer node (e.g., 102-2), the fault management service 106-1 relaunches the communication proxy 114, and the relaunched communication proxy 114 selects, from multiple checkpointed states, a common state to which the program 112 (and another corresponding program in the healthy computer node 102-3 that has not experienced a fault) are to roll back.

A "communication proxy" can refer to any intermediary entity (such as in the form of machine-readable instructions) between multiple entities, where the intermediary entity supports communication between the multiple entities. The multiple entities can include a program in a computer node and the communication library 110 that is in the computer node or outside the computer node. By providing the communication proxy 108-1 between the program 104-1 and the communication library 110, the program 104-1 does not directly contact the communication library 110. Instead, the program 104-1 sends a request to the communication proxy 108-1, which in turn forwards the request to the communication library 110. The request can be a request to invoke a routine of the communication library 110. For example, the invoked routine can be a send routine to send data from the program 104-1 to one or more other programs 104-2 and 104-3. The request can be in the form of a message, an information element within a message, or any other indicator that is used to seek a target action (e.g., send data to another computer node) at the communication library 110.

The communication library 110 also sends response information (that is responsive to the request) to the communication proxy 108-1, which forwards the response information to the program 104-1.

As shown in FIG. 1, each of the other computer nodes 102-2 and 102-3 can also include a respective fault management service 106-2 and 106-3 (similar to 106-1) and a respective communication proxy 108-2 and 108-3 (similar to 108-1) between the program in each such other computer node and the communication library 110.

Thus, data sent by the program 104-1 to the program 104-3 would pass through the communication proxy 108-1, the communication library 110, and the communication proxy 108-3.

The program 104-1 is connected to the communication proxy 108-1 over a communication channel 116. In some examples, the communication channel 116 can include a queue-based channel that includes a send queue to store messages sent by the program 104-1 to the communication library 110, and a receive queue to receive messages sent by the communication library 110 to the program 104-1. In other examples, other types of communication channels can be used between the program 104-1 and the communication proxy 108-1.

A point 118 indicates that the communication proxy 108-1 is detachable from the program 104-1, which means that the communication proxy 108-1 can be closed and restarted without the program 104-1 having to shut down. For example, the fault management service 106-1 can place the program 104-1 in an idle mode before closing the communication proxy 108-1. Once a new instance of the communication proxy 108-1 is started, the fault management service 106-1 can transition the program 104-1 to an active mode.

When in the idle mode, the program 104-1 pauses its execution. When in the active mode, the program 104-1 executes to perform its programmed tasks.

Similarly, the program 112 is connected to the communication proxy 114 over a communication channel 120, which is similar to the communication channel 116. A point 122 indicates that the communication proxy 114 is detachable from the program 112.

Similar communication channels are provided between programs and communication proxies in the other computer nodes 102-2 and 102-3.

Communication proxies in the computer nodes isolate respective programs in the computer nodes from the communication library 110 that does not have a fault tolerant mechanism to protect the programs against faults in the distributed computer system 100. In this manner, programs can be isolated from the communication library's lack of resiliency in handling faults in the computer nodes 102-1 to 102-3. As a result, systems can scale programs across a large quantity of computer nodes to increase computing performance using the communication efficiency afforded by a communication library such as the MPI library, SHMEM library, etc., without suffering from the communication library's lack of resiliency in the presence of computer node faults.

Relaunching a communication proxy can refer to closing a current instance of the communication proxy, followed by starting a new instance of the communication proxy. In some examples, closing the current instance of the communication proxy includes stopping execution of the current instance of the communication proxy, and removing information associated with the execution of the current instance of the communication proxy from a storage such as a memory 124.

A "state" of a program can refer to information (e.g., in the form of parameters) that is created or updated as the program executes. For example, the state of a machine learning training software (for training a machine learning system) can include weight and bias parameters that are updated as the machine learning system is trained, and training parameters such as a learning rate of the machine learning system, a training momentum of the machine learning system, a training epoch (which represents a current training pass of multiple training passes), and so forth.

When multiple instances of the machine learning training software are executed in respective computer nodes, the multiple instances of the machine learning training software can share a common state (e.g., a collection of the foregoing parameters set to the same values). In other words, as the multiple instances of the machine learning training software execute in the respective computer nodes, the multiple instances of the machine learning training software maintain the common state so that the multiple instances of the machine learning training software remain in synchronization with one another.

At specific time points (which may be periodic time points or time points in response to certain events), checkpoints can be taken of the states of the multiple instances of the machine learning training software. A "checkpoint" (or equivalently, a "checkpointed state") refers to a point-in-time copy of the state of a program, such as an instance of the machine learning training software. In the example of FIG. 1, checkpoints 1 to M (M≥2) are stored in the memory 124, where the checkpoints 1 to M contain respective states of the program 104-1 at corresponding points in time. Similar checkpoints may be stored in the memory 124 for the program 112.

Further, each of the other computer nodes 102-2 and 102-3 can also include a memory to store checkpoints for the programs 104-2 and 104-3 in the other computer nodes 102-2 and 102-3.

If any computer node that executes a given instance of the machine learning training software were to experience a fault, then the state of the given instance of the machine learning training software would become inconsistent (i.e., would no longer be common) with the states of the other instances of the machine learning training software that are running on healthy computer nodes. If the states of the instances of the machine learning training software were to become unsynchronized, then a distributed machine learning training performed by the multiple instances of the machine learning training software would fail or not produce correct results.

In such a scenario, the communication proxy 108-1 (after relaunch) can identify (with other communication proxies through the communication library 110) a state to which the program 104-1 can be rolled back to. The identified state is a common state to which all of the programs 104-1 to 104-3 can be rolled back to in the respective computer nodes 102-1 to 102-3. Once the communication proxy 108-1 identifies the common state, the communication proxy 108-1 can communicate the common state to the program 104-1.

If the program 112 is also executing in the computer node 102-1, the communication proxy 114 can identify a state to which the program 112 can be rolled back.

Rolling back a program to a given state refers to updating the parameters relating to the program to values represented by the given state. For example, a program may have started in State 1 and progressed to State M (M≥2). Each state of the program (e.g., the program 104-1) can be stored in a respective checkpoint in the memory 124. For example, checkpoint 1 in the memory 124 contains the parameter values for State 1, and checkpoint M in the memory 124 contains the parameter values for State M.

If the program 104-1 is currently in State M when the fault management service 106-1 detects a fault of the computer node 102-2, then the program 104-1 can roll back to a prior state, e.g., any of M−1, M−2, etc. (note that State M−1 occurred prior to State M, State M−2 occurred prior to State M−1, and so forth).

The prior state selected for rolling back the program 104-1 can be the most recent prior state (a known good state) that is shared among the multiple healthy computer nodes 102-1 and 102-3. A "known good state" can refer to a state of the programs at which the programs have successfully completed operation.

For example, if all of the computer nodes 102-1 and 102-3 contain checkpoints for State M−2, and less than all of the computer nodes 102-1 and 102-3 contain checkpoints for State M−1, then the relaunched communication proxy 108-1 selects State M−2 (and similarly the communication proxy 108-3 in the computer node 102-3 selects State M−2) as the state to which the program 104-1 would be rolled back, even though State M−1 is more recent than State M−2.

The relaunched communication proxy 108-1 would interact, through the communication library 110, with other relaunched communication proxies (including 108-3) in other healthy computer nodes that have not experienced a fault to select which state to roll back the programs. For example, the relaunched communication proxies can notify each other which states are stored as checkpoints by the respective healthy computer nodes.

In some examples, the fault management service 106-1 is associated with a health monitoring agent 130-1 to monitor the health of other computer nodes 102-2 and 102-3. In some examples, the health monitoring agent 130-1 may be part of the machine-readable instructions of the fault management service 106-1. In other examples, the health monitoring agent 130-1 may be separate from the fault management service 106-1.

The other fault management service 106-2 and 106-3 are similarly associated with respective health monitoring agents (not shown).

In some examples, a communication interface over which the health monitoring agent 130-1 can perform health monitoring includes off-node sockets 132 that allow the computer node 102-1 to communicate with the other computer nodes 102-2 and 102-3. A "socket" can refer to a software structure in a computer node that serves as an endpoint for sending and receiving data across a network. The sockets 132 are distinct from the communication library 110.

In other examples, a communication interface different from the sockets 132 can be used to perform health monitoring.

In some examples, the health monitoring agent 130-1 can use heartbeats for determining whether another computer node has experienced a fault. A "heartbeat" can refer to any piece of information, in the form of a message, an information element, or other indicator, that can be communicated between computer nodes.

The health monitoring agents associated with the fault management services 106-2 and 106-3 similarly can employ heartbeats for health monitoring of computer nodes. Each health monitoring agent can send heartbeats at specified time points to other computer nodes, which are monitored by the health monitoring agents in the other computer nodes. The time points at which heartbeats are sent can be periodic time points, for example. Each health monitoring agent expects to receive a heartbeat from a respective computer node at each of the specified time points.

If a health monitoring agent fails to receive a heartbeat from a given computer node at an expected time point (or fails to receive multiple heartbeats from the given computer node at multiple expected time points), then the health monitoring agent can identify the given computer node as experiencing a fault. In response to detecting a fault, the health monitoring agent can inform other health monitoring agents of the detected fault of the given computer node.

In addition to performing health monitoring using the health monitoring agent 130-1, the fault management service 106-1 according to some examples can also perform other tasks. For example, the fault management service 106-1 can control whether a program (e.g., 104-1 and/or 112) is to be placed in the idle mode or the active mode. The fault management service 106-1 can also launch a program (e.g., 104-1 and/or 112), such as in response to a request from another entity (e.g., a user, another program, or a machine).

The fault management service 106-1 can also define a runtime environment for a program (e.g., 104-1 and/or 112). A "runtime environment" refers to an environment of the distributed computer system 100 in which programs are to execute. For example, the runtime environment can indicate on which computer nodes the programs are to execute (the indicated computer nodes can include a subset less than all of the computer nodes of the distributed computer system 100). For example, network addresses, such as Internet Protocol (IP) addresses, Medium Access Control (MAC) addresses, etc., of the computer nodes can be included in information representing the runtime environment. The runtime environment can also identify how many communication proxies are present in each computer node. The runtime environment can also indicate which computer node(s) is (are) down and can no longer be used in performing a workload. The runtime environment can identify the programs that are running to perform a workload, such as by using process identifiers of the programs.

In some examples, the runtime environment of the distributed computer system 100 can be set by the fault management service 106-1 by using a runtime environment library 134-1. The runtime environment library 134-1 can include routines that can be called by the fault management service 106-1 to specify the runtime environment. In other examples, instead of using the runtime environment library 134-1, information of the runtime environment can be stored in a specified storage location, which can be used to identify the runtime environment.

Once the runtime environment is established by the fault management service 106-1, a communication proxy (e.g., 108-1 and/or 114) can access the runtime environment library 134-1 (or stored information of the runtime environment) to determine the runtime environment of the distributed computer system 100.

As the fault management service 106-1 detects computer node faults, the fault management service 106-1 can use the runtime environment library 134-1 to update the runtime environment, which can then be accessed by communication proxies to determine what computer nodes and programs are involved in a workload.

Figure 2:
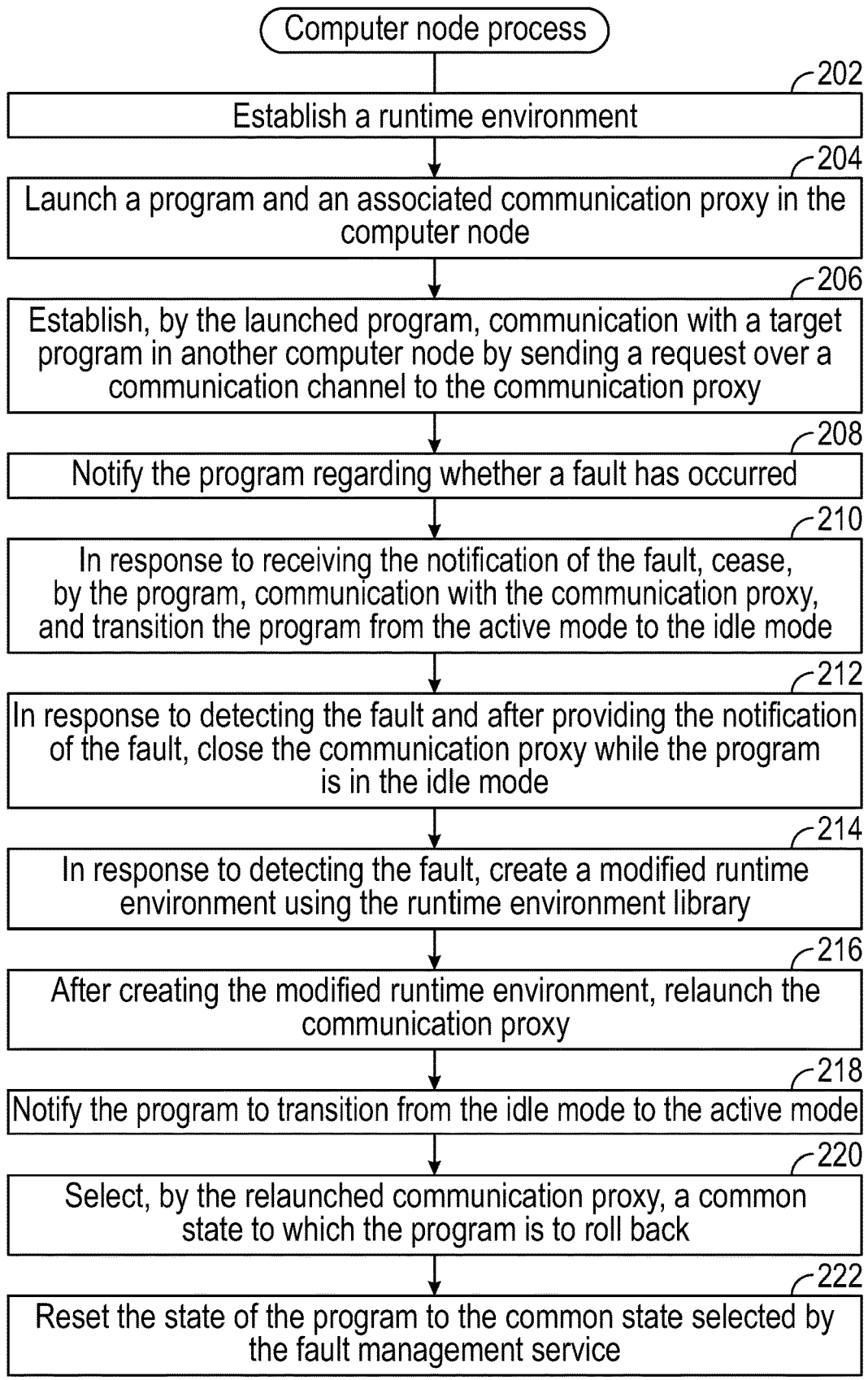
FIG. 2 is a flow diagram of a computer node process according to some examples.

FIG. 2 is a flow diagram of a process performed in the computer node 102-1. Similar processes may be performed in the other computer nodes 102-2 and 102-3.

The fault management service (e.g., 106-1) establishes (at 202) a runtime environment, such as by using the runtime environment library 134-1. After the runtime environment is established, the fault management service launches (at 204) a program (e.g., 104-1 and/or 112) as well as an associated communication proxy (e.g., 108-1 and/or 114) in the computer node 102-1. The launched program can establish communication (at 206) with a target program in another computer node by sending a request over a communication channel (e.g., 116 and/or 120) to the associated communication proxy, which in turn forwards the request to the communication library 110 to establish a data communication with the target program. For example, if the programs are instances of a machine learning training software, then the data communication can be used for performing a training task of a machine learning system.

After the requested operation is complete, the communication proxy can send a message (initiated by the communication library 110, for example) back to the requesting program informing the requesting program that the request was successfully completed and providing the requesting program with access to the results.

In some examples, the requesting program can perform a timeout check, in which the requesting program can start a timer while waiting for a completion message from the communication proxy. If the timer times out, then that may indicate that the requested operation did not successfully complete.

The fault management service can notify (at 208) a program (e.g., 104-1 and/or 112) in the computer node regarding whether a fault has occurred. In an example, the program can check (e.g., periodically or in response to an event) with the fault management service to inquire as to whether there has been a fault. In a different example, the fault management service can push a notification of the fault to the program when the fault management service detects the fault.

In response to receiving the notification of the fault, the program ceases (at 210) communication with its associated communication proxy (e.g., 108-1 and/or 114), and transitions from the active mode to the idle mode while waiting for the fault management service to address the fault.

In response to detecting the fault and after providing the notification of the fault to the program in the computer node, the fault management service closes (at 212) the communication proxy (e.g., 108-1 and/or 114) while the program is in the idle mode.

Note that other than the closing of the communication proxy, the remaining components of the computer node remain available (except that the program has been transitioned to the idle mode).

In response to detecting the fault that resulted in the fault management service closing the communication proxy in the computer node, the fault management service creates (at 214) a modified runtime environment using the runtime environment library 134-1 (similar to creating the runtime environment at the time of initial launch of the program).

In creating the modified runtime, the fault management service removes the computer node(s) that experienced a fault. If the hardware is available, the fault management service can substitute a faulty computer node with a healthy computer node. The modified runtime environment may include a network address of the healthy computer node that replaced the faulty computer node, for example.

After creating the modified runtime environment, the fault management service relaunches (at 216) the communication proxy (e.g., a new instance of 108-1 and/or 114). The communication proxy can access the runtime environment library 134-1 to determine the modified runtime environment. In addition, the fault management service notifies (at 218) the program to transition from the idle mode to the active mode.

The relaunched communication proxy selects (at 220) a common state to which the program is to roll back (this would be the same common state to which programs in other computer nodes would roll back). Checkpointed states are stored in the memory 124, and the relaunched communication proxy can select the common state from among the checkpointed states. This selection can be based on cooperation between the relaunched communication proxies in identifying which checkpointed states are available in all remaining healthy computer nodes.

The program resets (at 222) its state to the common state selected by the relaunched communication proxies. Resetting the state of the program to the common state can refer to resetting values of parameters that make up the state to the parameter values of the common state.

At this point, the program can recommence work using the relaunched communication proxy. Note that although the program is paused by setting the program in the idle mode while the fault management service addresses the detected fault, the program does not have to be restarted from the beginning, but rather can recommence work from a most recent common state.

By being able to recover from a computer node fault, techniques or mechanisms according to some implementations of the present disclosure are able to continue to run to completion by rolling back to a most recent common state. This can avoid a situation in which the programs running in the distributed computer system 100 loses all progress when a fault occurs.

Figure 3:
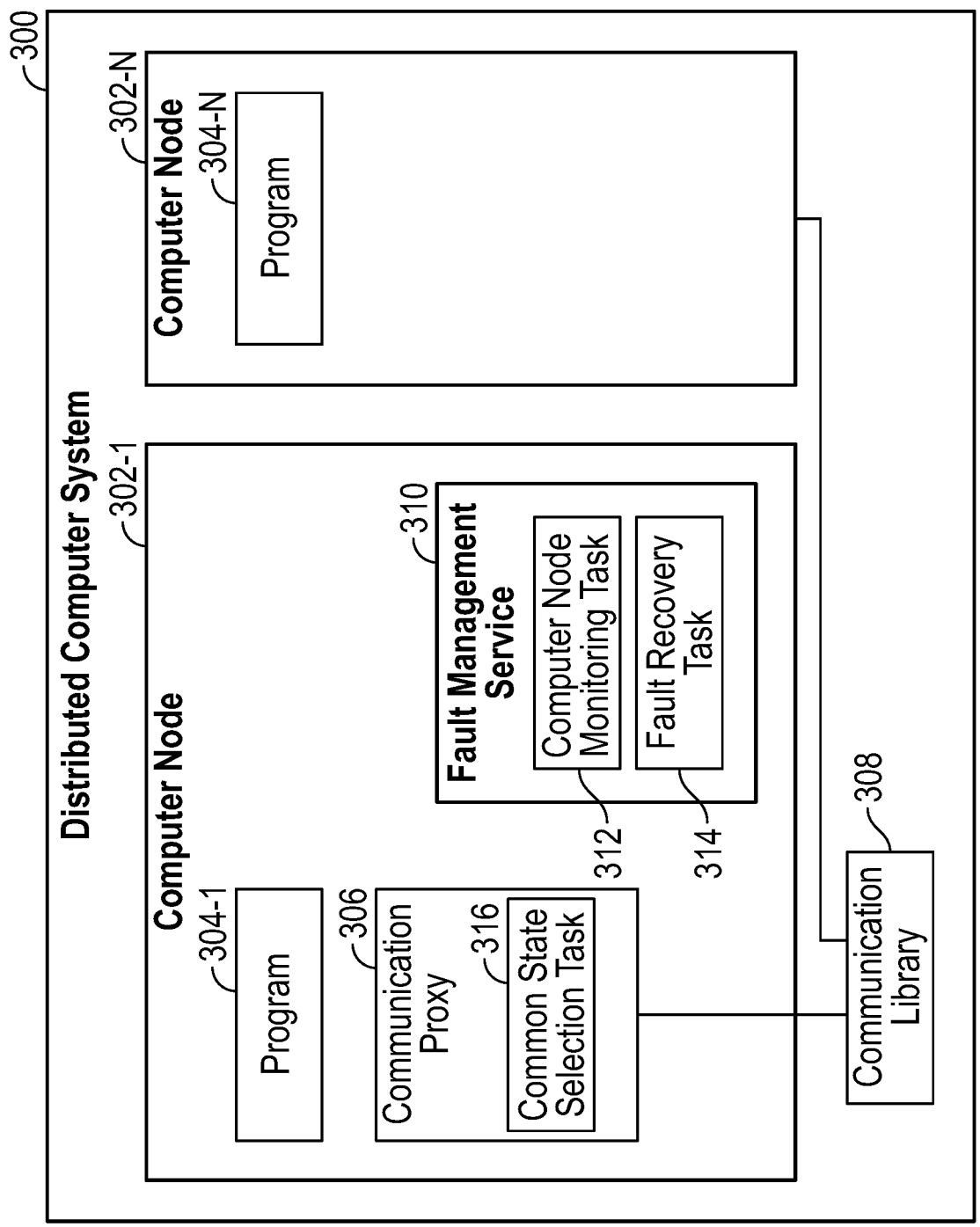
FIG. 3 is a block diagram of a system according to some examples.

FIG. 3 is a block diagram of a distributed computer system 300 according to some examples.

The distributed computer system 300 includes a plurality of computer nodes 302-1 to 302-N, where the plurality of computer nodes 302-1 to 302-N include respective programs 304-1 to 304-N to cooperate to perform a workload. In some examples, the workload is a machine learning training workload to train a machine learning system.

A first computer node 302-1 includes a communication proxy 306 between the program 304-1 of the first computer node 302-1 and a communication library 308 that supports communications between the program 304-1 and the programs of other computer nodes of the plurality of computer nodes 302-1 to 302-N.

In some examples, the communication library 308 is without support for fault tolerance; i.e., the communication library 308 is unable to recover from a fault of any of the computer nodes 302-1 to 302-N.

In some examples, the program 304-1 of the first computer node 302-1 sends a message through the communication proxy 306 to the communication library 308 to request performance of a task of the workload. The message can be to send data, receive data, trigger performance of a computation, perform synchronization among programs, etc.

The first computer node 302-1 also includes a fault management service 310 to perform a computer node monitoring task 312 to monitor a health of the other computer nodes. In some examples, monitoring the health can be based on using heartbeats communicated among the computer nodes 302-1 to 302-N.

The fault management service 310 also includes a fault recovery task 314 to, in response to a detection of a fault of a second computer node of the plurality of computer nodes 302-1 to 302-N, relaunch the communication proxy 306. The relaunched communication proxy 306 performs a common state selection task 316 to select, from a plurality of states, a common state to which the program 304-1 is to roll back.

In some examples, the relaunched communication proxy 306 accesses a memory (e.g., 124 in FIG. 1) that stores checkpointed information relating to the states, and the relaunched communication proxy 306 selects the common state based on the checkpointed information.

In some examples, the selected common state is a most recent known good state of the respective programs.

In some examples, the fault management service 310, in response to the detection of the fault of the second computer node, sends an indication of the fault of the second computer node to fault management services in other healthy computer nodes (but not to the second computer node 302-2 that has experienced a fault).

In some examples, the fault management service 310, in response to the detection of the fault of the second computer node 302-2, causes the program 304-1 in the first computer node 302-1 to transition from an active mode to an idle mode during a recovery process initiated by the fault management service 310 to address the fault of the second computer node 302-2. For example, the fault management service 310 can notify the program 304-1 of the fault, which can trigger the program 304-1 to transition to the idle mode.

In some examples, the fault management service 310 updates a runtime environment for performing the workload in response to the detection of the fault of the second computer node 302-2. After its relaunch, the communication proxy 306, determines, based on the updated runtime environment, which computer nodes of the plurality of computer nodes 302-1 to 302-N are involved in performing the workload.

In some examples, the fault management service 310 updates the runtime environment for performing the workload by using a shared library (e.g., the runtime environment library 134-1 of FIG. 1). After its relaunch, the communication proxy 306 determines, based on accessing the shared library, which computer nodes of the plurality of computer nodes are involved in performing the workload.

In some examples, the fault management service 310 updates the runtime environment for performing the workload by removing the second computer node 302-2 from the runtime environment, and possibly can add a new healthy computer node to the runtime environment.

Figure 4:
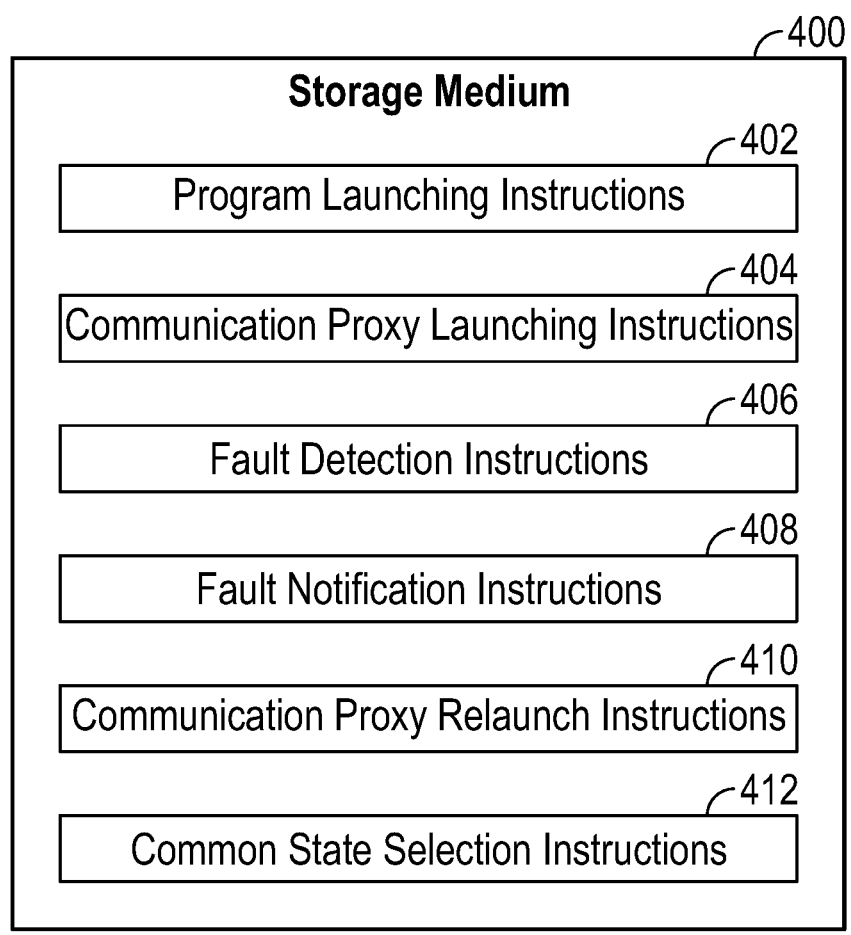
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a distributed computer system to perform various tasks.

The machine-readable instructions include program launching instructions 402 to launch programs in respective computer nodes of a plurality of computer nodes of the distributed computer system. The programs are to cooperate to perform a workload. Launching programs can include launching multiple instances of a given software.

The machine-readable instructions include communication proxy launching instructions 404 to launch, in the respective computer nodes, communication proxies between the programs and a communication library that is without support for fault tolerance and that is accessible by the programs through the communication proxies to communicate among the programs. The communication proxies are detachable from the associated programs and isolate the programs from the communication library that lacks support for fault tolerance.

The machine-readable instructions include fault detection instructions 406 to detect, by a fault management service in a first computer node of the plurality of computer nodes, a fault of a second computer node of the plurality of computer nodes. In some examples, detection of a fault can be responsive to failure to receive a heartbeat at an expected time.

The machine-readable instructions include fault notification instructions 408 to notify, by the fault management service in the first computer node, other fault management services in other computer nodes of the fault. The notification of the other fault management services of the fault of the second computer node can allow the other fault management services to take remediation action to address the fault.

The machine-readable instructions include communication proxy relaunch instructions 410 to, in response to the fault, relaunch the communication proxy in the first computer node. Relaunching the communication proxy includes closing a current instance of the communication proxy and starting a new instance of the communication proxy.

The machine-readable instructions include common state selection instructions 412 to, select, by the relaunched communication proxy from a plurality of states, a common state to which the programs are to roll back. In some examples, the relaunched communication proxy is to select the common state in cooperation with the other relaunched communication proxies.

Figure 5:
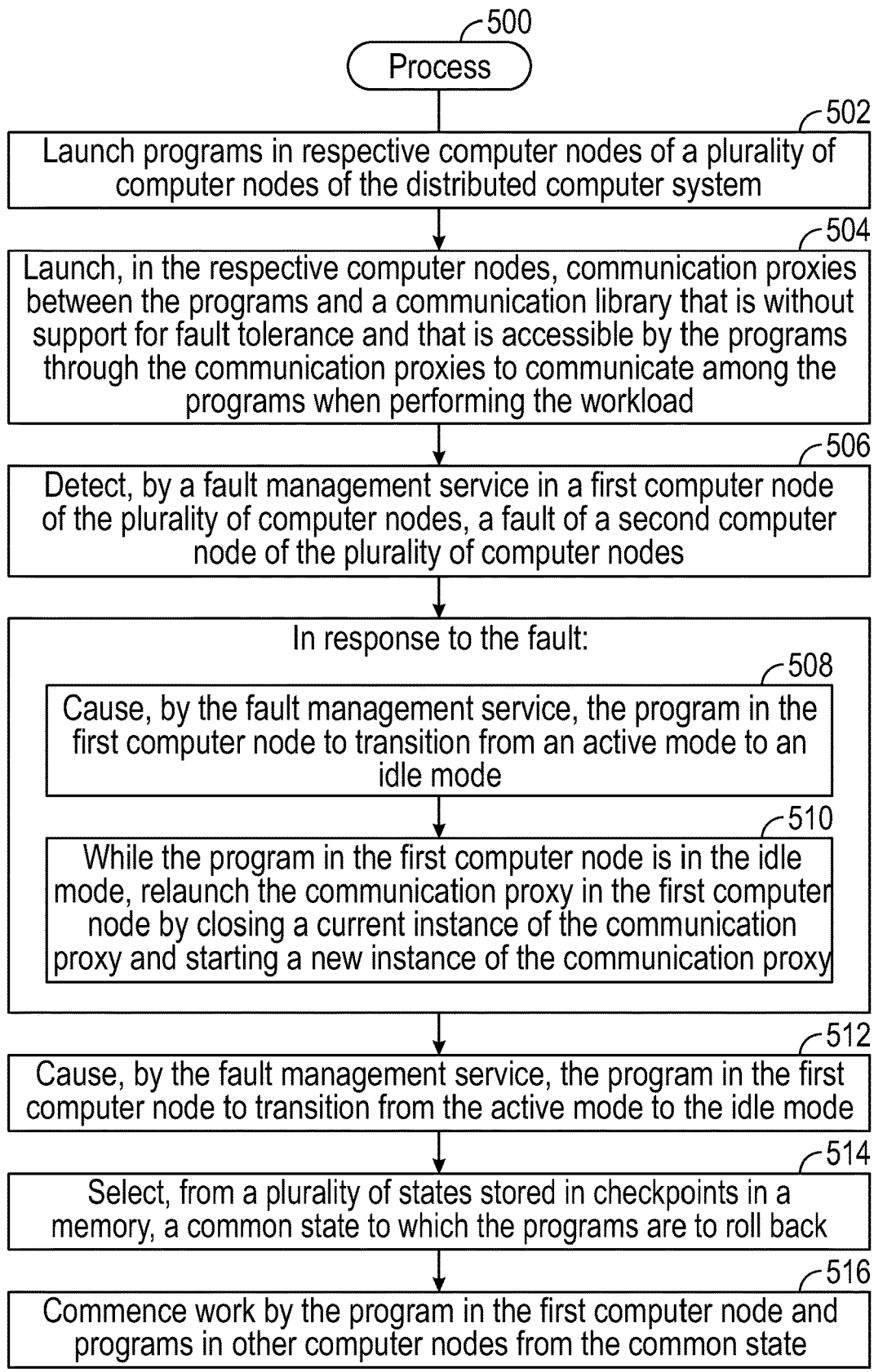
FIG. 5 is a flow diagram of a distributed computer system process according to some examples.

FIG. 5 is a flow diagram of a process 500 performed by a distributed computer system according to some examples.

The process 500 includes launching (at 502) programs in respective computer nodes of a plurality of computer nodes of the distributed computer system. The programs cooperate to perform a workload.

The process 500 includes launching (at 504), in the respective computer nodes, communication proxies between the programs and a communication library that is without support for fault tolerance and that is accessible by the programs through the communication proxies to communicate among the programs when performing the workload. The communication library can include an MPI library, SHMEM library, etc.

The process 500 includes detecting (at 506), by a fault management service in a first computer node of the plurality of computer nodes, a fault of a second computer node of the plurality of computer nodes. The detection can be response to failing to receive a heartbeat at an expected time.

The process 500 includes, in response to the fault, causing (at 508), by the fault management service, the program in the first computer node to transition from an active mode to an idle mode, and while the program in the first computer node is in the idle mode, relaunching (at 510) the communication proxy in the first computer node by closing a current instance of the communication proxy and starting a new instance of the communication proxy.

The process 500 includes causing (at 512), by the fault management service, the program in the first computer node to transition from the active mode to the idle mode.

The process 500 includes selecting (at 514), by the relaunched communication proxy from a plurality of states stored in checkpoints in a memory, a common state to which the programs are to roll back. The selected common state can be a most recent known good state.

The process 500 includes commencing (at 516) work by the program in the first computer node and programs in other computer nodes from the common state.

A storage medium (e.g., 400 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:
1. A distributed computer system comprising:
a plurality of computer nodes, wherein the plurality of computer nodes comprise respective programs to cooperate to perform a workload, and wherein a first computer node of the plurality of computer nodes comprises:

a communication proxy between the program of the first computer node and a communication library that supports communications between the program of the first computer node and the programs of other computer nodes of the plurality of computer nodes; and a fault management service to:
monitor a health of the other computer nodes, and
in response to a detection of a fault of a second computer node of the plurality of computer nodes, relaunch the communication proxy,
wherein the relaunched communication proxy is to select, from a plurality of states, a common state to which the programs are to roll back.

2. The distributed computer system of claim 1, wherein the program of the first computer node is to send a message through the communication proxy to the communication library to request performance of a task of the workload.

3. The distributed computer system of claim 1, wherein the workload comprises a machine learning workload involving the respective programs of the plurality of computer nodes.

4. The distributed computer system of claim 1, wherein the relaunched communication proxy is to:
access a memory that stores checkpointed information relating to the states,
wherein the selecting of the common state is based on the checkpointed information.

5. The distributed computer system of claim 4, wherein the selected common state is a most recent known good state of the respective programs.

6. The distributed computer system of claim 1, wherein the fault management service is to, in response to the detection of the fault of the second computer node, send an indication of the fault of the second computer node to fault management services in computer nodes of the plurality of computer nodes other than the second computer node.

7. The distributed computer system of claim 1, wherein the fault management service is to, in response to the detection of the fault of the second computer node, cause the program in the first computer node to transition to an idle mode during a recovery process initiated by the fault management service to address the fault of the second computer node.

8. The distributed computer system of claim 1, wherein the fault management service is to update a runtime environment for performing the workload in response to the detection of the fault of the second computer node, and
wherein the relaunched communication proxy is to determine, based on the updated runtime environment, which computer nodes of the plurality of computer nodes are involved in performing the workload.

9. The distributed computer system of claim 8, wherein the fault management service is to update the runtime environment for performing the workload by using a shared library, and wherein the relaunched communication proxy is to determine, based on accessing the shared library, which computer nodes of the plurality of computer nodes are involved in performing the workload.

10. The distributed computer system of claim 8, wherein the fault management service is to update the runtime environment for performing the workload by removing the second computer node from the runtime environment.

11. The distributed computer system of claim 10, wherein the fault management service is to update the runtime environment for performing the workload by adding a healthy computer node to replace the second computer node.

12. The distributed computer system of claim 1, wherein the first computer node comprises a communication channel over which the program of the first computer node is to communicate with the communication library, and wherein the communication channel comprises queues to store messages passed between the program of the first computer node and the communication library.

13. The distributed computer system of claim 1, wherein the relaunching of the communication proxy comprises closing a current instance of the communication proxy and launching a new instance of the communication proxy.

14. The distributed computer system of claim 1, wherein the communication library is without support for fault tolerance.

15. A non-transitory machine-readable storage medium comprising instructions that upon execution cause a distributed computer system to:
launch programs in respective computer nodes of a plurality of computer nodes of the distributed computer system, wherein the programs are to cooperate to perform a workload;
launch, in the respective computer nodes, communication proxies between the programs and a communication library that is without support for fault tolerance and that is accessible by the programs through the communication proxies to communicate among the programs;
detect, by a fault management service in a first computer node of the plurality of computer nodes, a fault of a second computer node of the plurality of computer nodes;
notify, by the fault management service in the first computer node, other fault management services in other computer nodes of the fault;
in response to the fault, relaunch the communication proxy in the first computer node; and
select, by the relaunched communication proxy from a plurality of states, a common state to which the programs are to roll back.

16. The non-transitory machine-readable storage medium of claim 15, wherein the relaunched communication proxy is to select the common state in cooperation with the other relaunched communication proxies.

17. The non-transitory machine-readable storage medium of claim 15, wherein the instructions upon execution cause the distributed computer system to:
in response to the fault, cause the program in the first computer node to transition from an active mode to an idle mode,
wherein the relaunch of the communication proxy in the first computer node occurs while the program in the first computer node is in the idle mode.

18. The non-transitory machine-readable storage medium of claim 15, wherein the workload comprises a machine learning workload involving the programs, the machine learning workload comprising a workload to train a machine learning system.

19. A method of a distributed computer system, comprising:
launching programs in respective computer nodes of a plurality of computer nodes of the distributed computer system, wherein the programs cooperate to perform a workload;
launching, in the respective computer nodes, communication proxies between the programs and a communication library that is without support for fault tolerance and that is accessible by the programs through the communication proxies to communicate among the programs when performing the workload;

detecting, by a fault management service in a first computer node of the plurality of computer nodes, a fault of a second computer node of the plurality of computer nodes;

in response to the fault:
causing, by the fault management service, the program in the first computer node to transition from an active mode to an idle mode,
while the program in the first computer node is in the idle mode, relaunching the communication proxy in the first computer node by closing a current instance of the communication proxy and starting a new instance of the communication proxy;

causing, by the fault management service, the program in the first computer node to transition from the active mode to the idle mode;

selecting, by the relaunched communication proxy from a plurality of states stored in checkpoints in a memory, a common state to which the programs are to roll back; and commencing work by the program in the first computer node and programs in other computer nodes from the common state.

20. The method of claim 19, wherein the fault management service is to update a runtime environment for performing the workload in response to detecting the fault of the second computer node, and wherein the method comprises:

determining, by the communication proxy after the relaunch, based on the updated runtime environment, which computer nodes of the plurality of computer nodes are involved in performing the workload.

\* \* \* \* \*